United States Patent

[11] 3,573,542

| [72] | Inventors | William N. Mayer<br>White Bear Lake;<br>Richard V. Bonin, Jr., St. Paul; Robert W.<br>Johnson, Minneapolis, Minn. |
|---|---|---|
| [21] | Appl. No. | 716,877 |
| [22] | Filed | Mar. 28, 1968 |
| [45] | Patented | Apr. 6, 1971 |
| [73] | Assignee | Control Data Corporation<br>Minneapolis, Minn. |

[54] GASEOUS DISPLAY CONTROL
11 Claims, 17 Drawing Figs.

[52] U.S. Cl. .................................................. 315/169,
    315/170, 315/173, 315/174, 340/166, 340/173,
    340/324
[51] Int. Cl. ...................................................... H05b 37/00
[50] Field of Search ............................................ 315/160,
    170, 169, 169 (TV), 173, 174, 175, 176; 340/166,
    173, 324, (Light Digest)

[56] References Cited
UNITED STATES PATENTS

| 3,205,403 | 9/1965 | Schwertz | 315/169 |
| 3,262,010 | 7/1966 | Kazan | 315/169X |
| 3,341,826 | 9/1967 | Lee | 340/173 |

*Primary Examiner*—John W. Huckert
*Assistant Examiner*—R. F. Polissack
*Attorneys*—Thomas G. Devine and Bruce A. Nemer ABSTRACT: A method and apparatus for controlling the lighting of cells, the sustaining of lit cells, and the extinguishing of lit cells in a gaseous discharge display of the type where electrodes controlling the condition of the cells are insulated from the gas within each cell is disclosed.

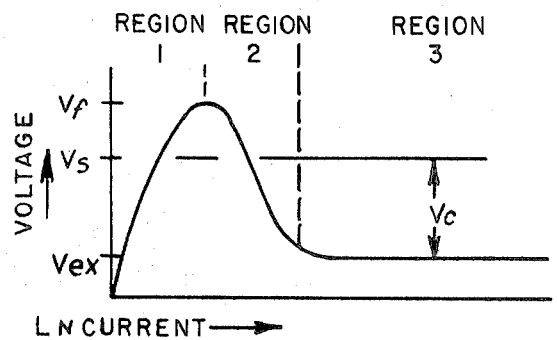
FIG. 2
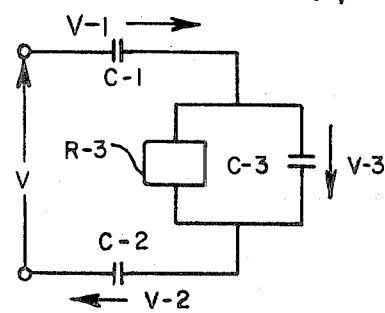
FIG. 3A
| TIME | V | V-1 | V-2 | $V_C = (V-1)+(V-2)$ | V-3 |
|---|---|---|---|---|---|
| $0 \leq t < T-1$ | + | − | − |  | − |
| $T-1 \leq t < T-2$ | + | − | − | − | − |
| $T-2 \leq t < T-3$ | − | − | − | − | + |
| $T-3 \leq t < T-4$ | − | + | + | + | + |
| $T-4 \leq t < T-5$ | + | + | + | + | − |
| $T-5 \leq t < T-6$ | + | − | − | − | − |
FIG. 3B
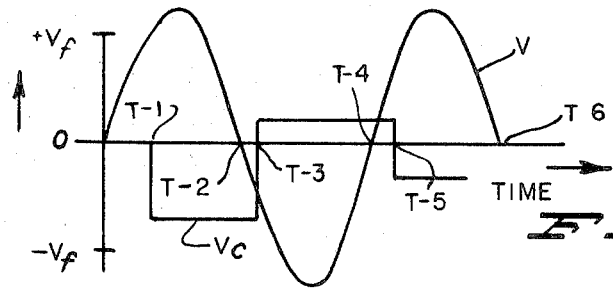
FIG. 4A
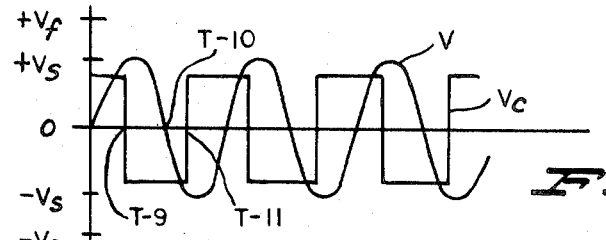
FIG. 4B
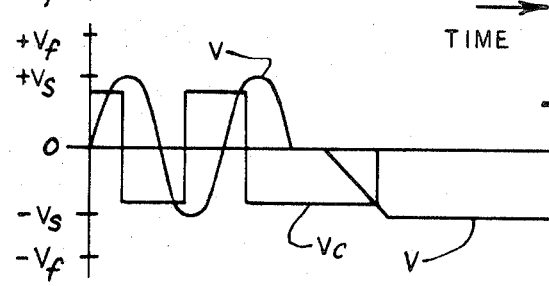
FIG. 4C
INVENTORS
RICHARD V. BONIN JR.
WILLIAM N. MAYER
BY ROBERT W. JOHNSON
Bruce A Nemer
AGENT

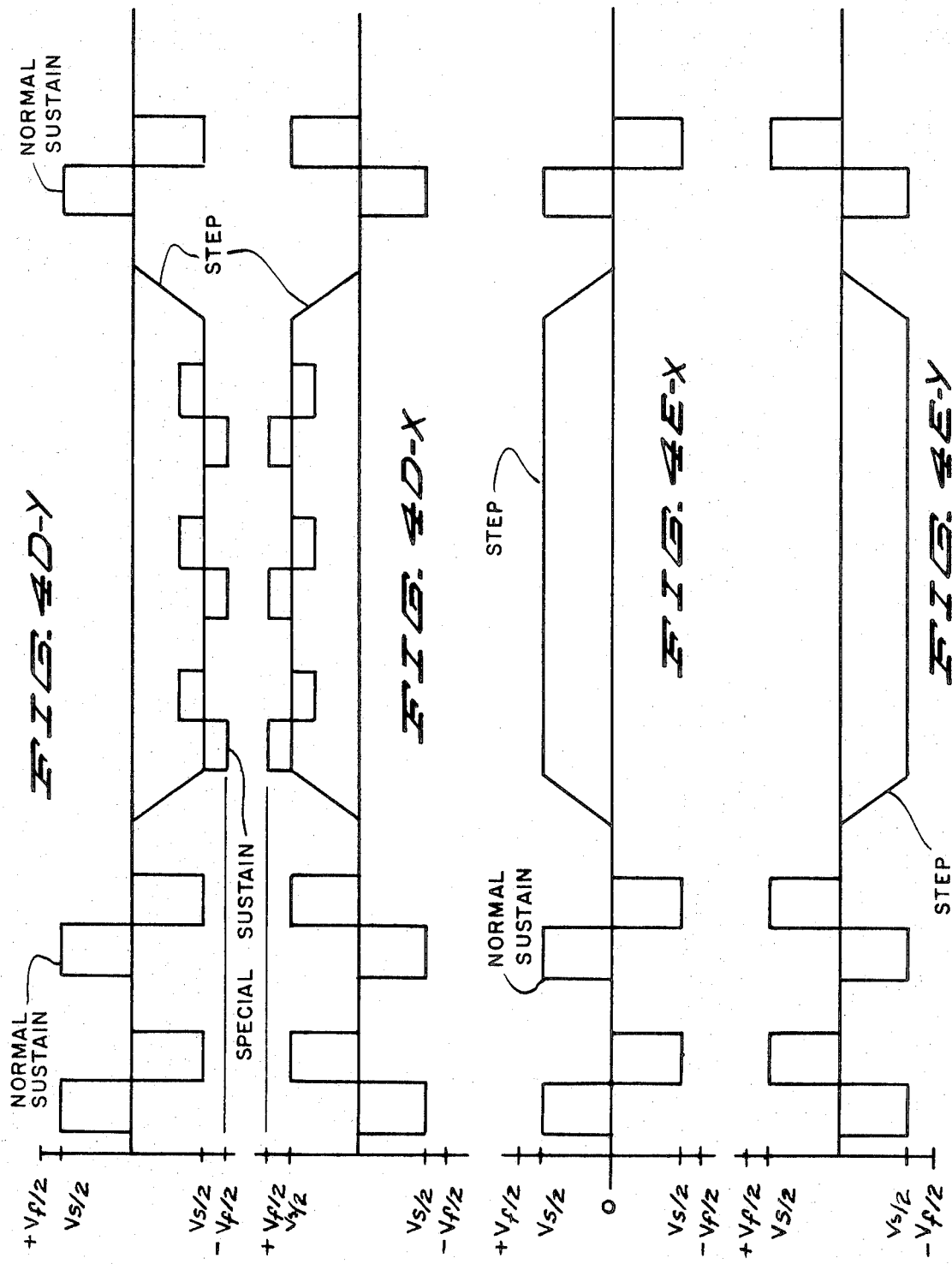

Patented April 6, 1971

INVENTORS
RICHARD V. BONIN JR.
WILLIAM N. MAYER
ROBERT W. JOHNSON
BY Bruce A Nemer
AGENT

INVENTORS
RICHARD V. BONIN JR.
WILLIAM N. MAYER
BY ROBERT W. JOHNSON

Bruce A Nemer

AGENT

GASEOUS DISPLAY CONTROL

BACKGROUND

A new generation display device, a flat panel gaseous discharge display, is desirable as a replacement for the cathode ray tube in common use today. The gaseous display has advantages over the cathode ray tube in being of lower weight, requiring lower operating power, and having the ability to be controlled by digital rather than analog signals.

Since the gaseous discharge display is relatively new, effort has been concentrated on building the physical display itself; little consideration has been given to the application of the voltages controlling the display, the drive voltages. Prior art techniques of applying the drive voltages to a gaseous discharge display have, in fact, made construction of a physical display much more difficult because they placed severe physical tolerances on the panel. This physical burden was, for the most part placed on the panel in an effort to obtain good operating margin.

Margin relates to the ability to light certain selected cells of the panel while leaving all unselected cells unlit. Also, margin relates to the ability to erase certain selected lit cells while not affecting the remaining lit cells. Prior art techniques of applying drive voltages have allowed poor margin and, as a result, have forced extreme physical tolerances upon the panel and the electronics controlling the display to allow the display to operate successfully, The present invention teaches the solution to these problems.

DESCRIPTION

It is then an object of the present invention to provide a method and apparatus for controlling a gas discharge display to allow superior margin than heretofore possible.

It is a further object of the present invention to provide a method and apparatus to control a gas discharge display in such a manner as to allow practical construction tolerances for the physical display panel and the control electronics.

These and further objects and advantages of the present invention will become clearer in the light of the following detailed description of an illustrative embodiment of the invention and from the appended claims.

The illustrative embodiment may best be described by reference to the accompanying drawings where:

FIG. 2 shows a voltage versus current characteristic for a single cell which is useful in explaining the present invention;

FIG. 3 shows a schematic model of a single cell which is again useful in explaining the present invention;

FIG. 4 shows various voltage waveforms explaining and applying the teachings of the present invention;

Figure 1:
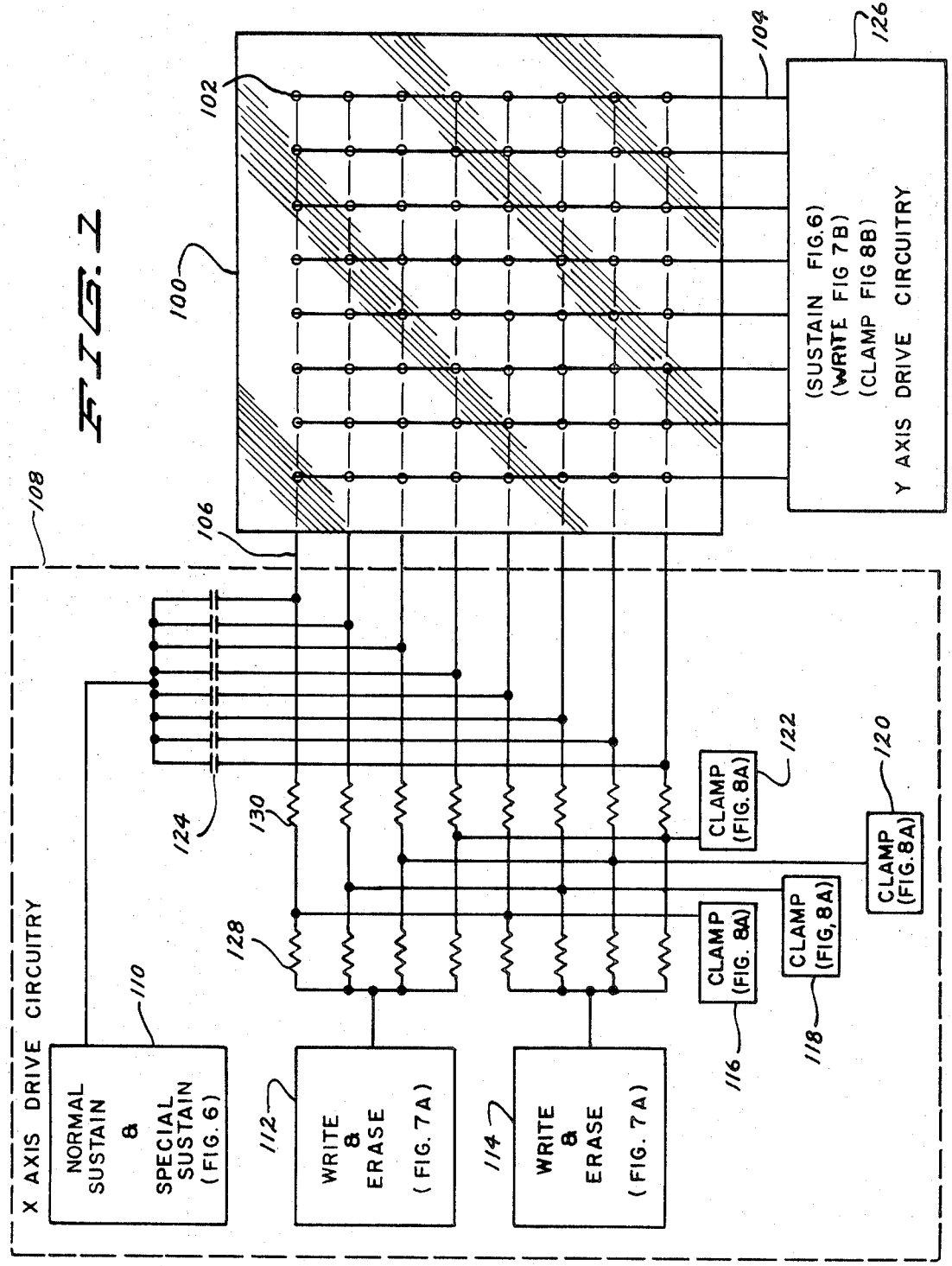
FIG. 1 shows a representation of a total display system using the teachings of the present invention.
Figure 6:
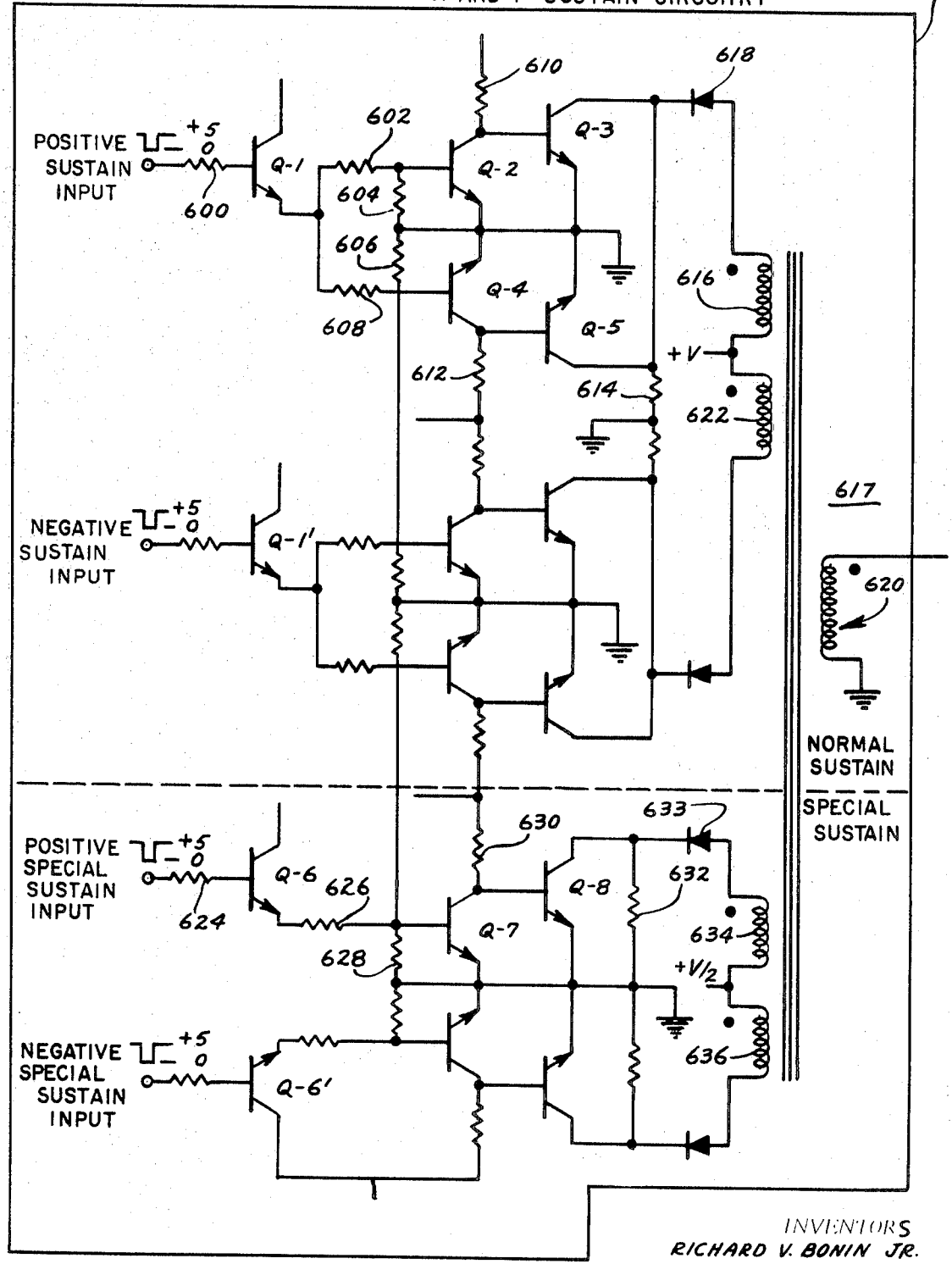

FIG. 6, 7, and 8 show schematic representations of the electronic circuitry within the blocks shown in FIG. 1.

In FIG. 1, a gaseous discharge display panel 100 is shown with 64 individual cells 102 arranged in an 8 by 8 array. A set of eight Y drive lines 104 enter the display from the bottom and overlay cells 102. A set of eight X drive lines 106 enter the display from the side and underlay cells 102 so that each individual cell 102 lies between one of the set of Y drive lines 104 and one of the set of X drive lines 106. X axis drive circuitry generally designated as 108 comprises a normal and special sustain block 110, two write and erase blocks 112 and 114, and four clamp blocks 116, 118, 120, and 122. Write and erase block 112 applies voltage to a group of drive lines formed by the top four X drive lines 106, and write and erase block 114 applies voltage to a group of drive lines formed by the lower four X drive lines 106. Clamp 116 is connected to the first line of the top group and the first line of the bottom group, clamp 118 is connected to the second line of the top group and the second line of the bottom group, clamp 120 is connected to the third line of the top group and the third line of the bottom group, and clamp 122 is connected to the fourth line of the top group and the fourth line of the bottom group.

This matrix interconnection of the write and erase blocks and the clamp blocks shown in FIG. 1 allows individual line selection while eliminating the need for a write and erase block for each line. An individual line is selected by energizing either block 112 or block 114 and also energizing one individual clamp block. For example, in order to apply a write signal to the top X line 106, write block 112 and clamp 116 are energized. Selecting clamp 116 has the effect of disabling it and allowing the write current from block 112 to flow through the top X line 106 to display 100. The remaining three lines in the top group are clamped to ground by clamps 118, 120, and 122. The top line of the second group energized by write block 114 is also free to conduct current to display 100 because clamp 116 is disabled; however, write block 114 has not been energized, so no current is applied. Each of the drive lines may then be individually selected by the proper selection of one write and erase block and one clamp block.

After the desired lines have been written, voltage from sustain block 110 of FIG. 1 is applied to all X lines 106 through eight individual capacitors 124 to sustain the display.

When it is desired to erase the display, the line selection used is identical to that used in the write procedure.

The configuration of the Y axis drive circuitry is identical to that of the X axis drive circuitry 108 and is generally designated as 126. A particular cell 102 then receives one-half of the voltage applied to it from the X axis drive circuits 108 and one-half from the Y axis drive circuits 126.

The blocks of FIG. 1 have references to subsequent FIGS. within them to indicate the FIGS. showing the representation of the circuitry within that particular block.

A construction technique for panel 100 may be found within an application entitled Gaseous Discharge Display Device, Ser. No. 666,631, filed Sept. 11, 1967, now abandoned, by the present inventors in conjunction with Mr. Robert G. Ahonen.

In FIG. 2, a voltage versus the natural logarithm of current for a cell 102 filled with an appropriate gas such as a mixture of helium and neon is shown. The application referred to above also teaches the use of this gas. The approximate boundaries between a region 1 (a preglow region) a region 2 (a region in which an unmatured discharge exists) and a region 3 (a normal glow region) are shown. Additional regions of abnormal glow and arc are not shown because the cell is constrained to operate within the first three regions. As an increasing voltage is applied to the cell, a slowly increasing current is seen until the voltage $V_f$ is reached. $V_f$ is the voltage at which the gas within the cell begins to discharge or form a plasma. The voltage necessary to sustain the cell then rapidly decreases through region 2, the unmatured discharge egion, and reaches region 3, the normal glow region. As the cell discharges or a plasma forms within the cell, a large current may be sustained by a relatively small applied voltage designated as $V$ extinguish or $V_{ex}$. A voltage below this minimum will not support a discharge within the cell and the cell operating point returns from region 3 to region 1. The remaining voltages designated within FIG. 2 will be explained later.

In FIG. 3, a capacitive model of a cell 102 of panel 100 of FIG. 1 is shown. The origin of this model is explained in the application previously referred to entitled Gaseous Discharge Display Device. Basically, the gas within a cell 102 is represented by a capacitor C-3 and a nonlinear resistance R-3. Voltages are not applied directly to cell 102 but are applied through insulating media which are represented in FIG. 3A by capacitors C-1 and C-2. The voltage applied across one of the set of X drive lines 106 and one of the set of Y drive lines 104 is shown within FIG. 3A as V. The voltage across capacitor C-1 is shown as V-1, and the voltage across capacitor C-2 is shown as V-2. The chart comprising FIG. 3B shows the polarity of the various voltages for times related to the waveform within FIG. 4.

In FIG. 4, FIGS. 4A, 4B, and 4C are used to basically explain the mechanism involved in the present invention. FIGS. 4D and 4E represent the actual waveforms generated by the preferred embodiment of the present invention.

Figure 5:
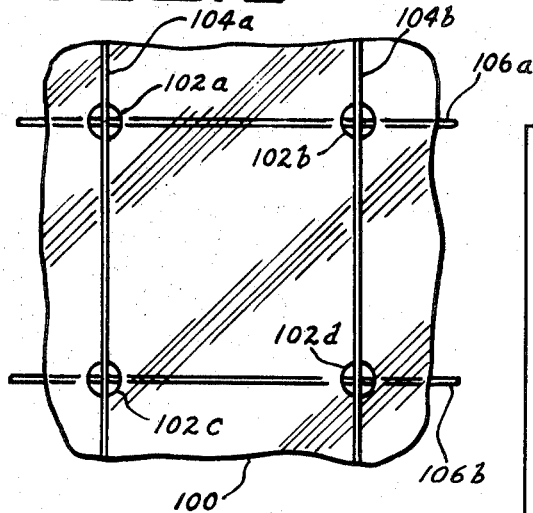
FIG. 5 shows a portion of a gas discharge display panel useful in explaining the superior margin of the present invention.

In FIG. 5, a portion of panel 100 is shown containing cells 102a, 102b, 102c, and 102d. Y drive lines 104a and 104b are also shown along with X drive lines 106a and 106b. A definition and a derivation of the margin of the present invention will be explained with respect to FIG. 5.

In FIG. 6, a transistor Q–1 is maintained in a normally conducting state by bias current provided through a resistor 600. Transistor Q–1 provides bias to two other transistors Q–2 and Q–4 to maintain them in a normally conducting state also. Transistor Q–2 prevents bias from reaching a transistor Q–3 and thus maintains transistor Q–3 in a normally nonconducting state. Likewise transistor Q–4 maintains a transistor Q–5 in a normally nonconducting state. Transistors Q–3 and Q–5 are connected in electrical parallel in such a manner as to cause their combined output current to flow through a primary winding 616 of a transformer generally designated as 617. Current then flows from the voltage supply through primary winding 616, through diode 618, and through transistors Q–3 and Q–5 in parallel to ground. Current conducted through primary winding 616 in this way causes a positive output pulse from a secondary winding 620 of transformer 617, as indicated by the dot convention upon the windings of transformer 617. In order to render transistors Q–3 and Q–5 conducting and provide a positive output pulse from secondary winding 620; the normal bias to transistor Q–1 is removed thus rendering it nonconductive; rendering transistor Q–1 nonconductive removes the bias to transistors Q–2 and Q–4 thus also rendering them nonconductive; and rendering transistors Q–2 and Q–4 nonconductive allows bias to flow to transistors Q–3 and Q–5 through resistors 610 and 612 respectively. Thus, a positive going output voltage pulse is provided by secondary winding 620 when a negative going voltage pulse is applied to the base of transistor Q–1. A negative going output pulse is generated in secondary winding 620 by causing current to flow through another primary winding 622, as indicated by the dot convention upon primary winding 622. The mechanism for causing current to flow in primary winding 622 is similar to that already explained for causing current to flow in primary winding 616. Thus if a negative going pulse (from a positive value to the ground and back to a positive value) is alternately applied to the base of transistor Q–1 and to the base of transistor Q–1', primary windings 616 and 622 will be alternately energized. Secondary winding 620 will then first produce a positive pulse and then produce a negative pulse. This output from secondary windings 620 comprises the normal sustain pulse shown in FIGS. 4D and 4E. The special sustain pulses of FIG. 4D are similarly created by alternately energizing primary windings 634 and 636 of transformer 617.

Figure 7A:
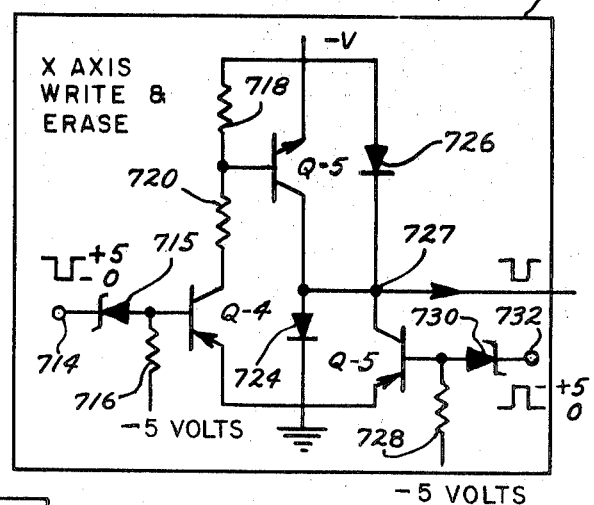
Figure 7B:
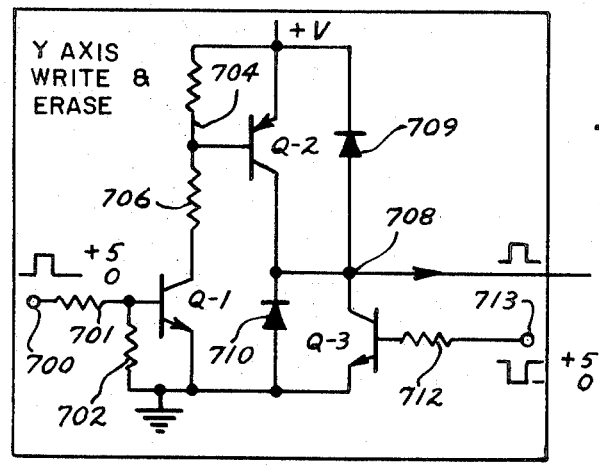

In FIG. 7B, a positive going pulse (from zero to a positive voltage and back to zero) applied to an input 700 will cause a normally nonconducting transistor Q–1 to assume a conducting state. When Q–1 becomes conducting, current drawn through a resistor 704 causes a second normally nonconducting transistor Q–2 to provide an output current pulse to an output point 708. A diode 709 insures that the voltage at output point 708 will not significantly exceed the value of the voltage supply. A second diode 710 insures that the voltage at output point 708 will not significantly fall below ground. In order for the current pulse provided by transistor Q–2 to output point 708 to flow to another circuit, a normally conducting transistor Q–3 must be rendered nonconducting; otherwise, transistor Q–3 will shunt the current pulse provided to output point 708 to ground. Transistor Q–3 is rendered nonconducting by a negative going pulse (from a positive voltage to ground and back to a positive voltage). The combination of diode 710 and normally conducting transistor Q–3 clamps output point 708 to ground unless a negative going pulse input is provided to transistor Q–3. With transistor Q–3 nonconductive, a positive going output pulse may be provided from output point 708. The operation of FIG. 7A is substantially the inverse of that of FIG. 7B. That is, a negative going pulse is provided to input 714, a positive going pulse is provided to input 732, and a negative going pulse is provided by output 727.

Figure 8A:
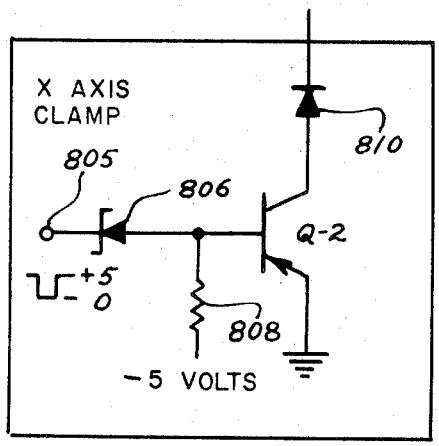
Figure 8B:
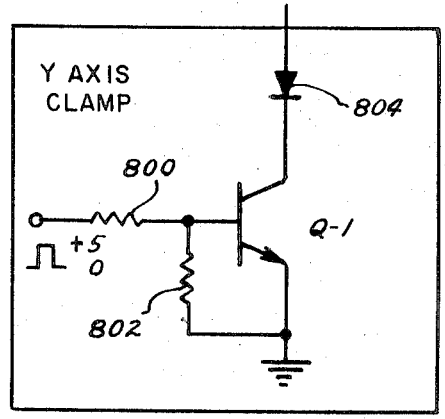

In FIG. 8B, a positive going pulse causes a normally nonconducting transistor Q–1 to assume a conducting state. Transistor Q–1 then conducts current through diode 804 to ground. The circuit of FIG. 8A operates an inverse fashion from that of FIG. 8B in that a negative going pulse causes transistor Q–2 to assume a conducting state.

OPERATION

Since the operations of gas discharge panels are not well known, an explanation of the basic mechanisms involved in driving a panel will preceed the explanation of the actual display driving technique taught by the present invention.

Basically then, assume a cell having a voltage versus current characteristic as shown in FIG. 2; assume further the cell may be represented by the model of FIG. 3A; and assume finally that a driving voltage waveform $V$ as shown in FIG. 4A is applied to the model of FIG. 3A. The mechanisms involved in writing (lighting) a cell may then be explained with the aid of FIG. 3B. With time between 0 and T–1, the applied voltage $V$ is in a positive direction and is less than $V_f$ in magnitude. Thus, the applied voltage is in Region 1 of FIG. 2. The model of FIG. 3A then acts as a normal series capacitor circuit. That is, since the direction of the arrows in FIG. 3A is from positive to negative, the positive applied voltage causes the voltage across each capacitor to build in a negative direction with respect to the direction of the arrows associated with each capacitor. At time T–1 the applied voltage exceeds $V_f$, the firing voltage of the cell, and the cell begins to discharge. Because the cell is slightly overdriven, a fast maturing discharge will take place. That is, within 10 nanoseconds the discharge will be fully matured or will have traveled from Region 1 to Region 3 of FIG. 2. At full maturity, the voltage across the cell will be $V_{ex}$ and the cell will support a substantial current. Therefore, the difference between the applied voltage $V$ and the voltage across the cell $V_{ex}$ will attempt to charge capacitors C–1 and C–2. Since the cell and the driving circuits will both support a substantial current, C–1 and C–2 will rapidly charge. The voltage across C–1 and C–2 is indicated by the dotted voltage waveform labeled $V_c$ within FIG. 4A. As capacitors C–1 and C–2 charge or $V_c$ increases in value, the voltage across the cell decreases below $V_{ex}$ and the cell extinguishes. That is, the cell returns from Region 3 to Region 1. While a fully matured discharge forms in 10 nanoseconds, the cell remains lit for approximately 100 nanosecond while C–1 and C–2 charge. The polarities of all voltages during this time, between T–1 and T–2, are indicated on the chart of FIG. 3B. At T–2, the applied voltage $V$ changes from a positive to a negative direction. Since capacitor C–3 is small and hence requires only a small current to charge, the voltage across capacitor C–3 follows the input voltage and changes its polarity also. The voltages across capacitors C–1 and C–2 do not change polarities since insufficient current is present to discharge them. The polarities of the voltages during this period, between T–2 and T–3, are indicated by the third line of the chart within FIG. 3B. During this time period, the voltages across capacitors C–1 and C–2 appear to aid the applied voltage $V$ when viewed from the cell capacitor C–3. Thus, the voltage across the cell reaches its firing voltage $V_f$ earlier in the cycle because of the voltages remaining on capacitors C–1 and C–2, as is seen from the earlier firing point of the cell at T–3 in the negative excursion of the applied voltage $V$. Again a plasma is formed within the cell and the cell discharges. Again, the voltage across the cell rapidly decreases. This time, however, the difference between the voltage across the cell and the driving voltage discharges capacitors C–1 and C–2 and then recharges them in the opposite direction because of the change in polarity of the input voltage. Again, after capacitors C–1 and C–2 have sufficiently charged, the difference between their voltage and the applied voltage decreases below $V_{ex}$ and extinguishes the cell. Again, this occurs in approximately 100 nanoseconds. The discharging and charging of capacitors C-1 and C-2 may be seen by the sudden change in the voltage $V_c$ of FIG. 4A at time T-3. Between times T-3 and T-4 then, the voltage across capacitors C-1 and C-2 again appears to the cell capacitor C-3 to be subtractive from the applied voltage $V$. After T-4, however, the applied voltage $V$ again reverses its polarity and the voltage across capacitor C-1 and C-2 again appears additive to the applied voltage $V$. When, at T-5, the sum of the applied voltage and the voltage across capacitors C-1 and C-2 again exceeds the firing voltage of the cell, the process begins to repeat itself.

It is seen that after a cell is initially discharged, the applied voltage may be withdrawn and a voltage may remain across capacitors C-1 and C-2. This voltage is termed "memory" of the cell. It is this memory voltage which allows the cell to fire when an oscillating voltage less then the firing voltage of the cell is applied, as shown in FIG. 4B.

In FIG. 4B, the cell is assumed to have an initial positive polarity memory voltage. An applied voltage $V$ which is less than $V_f$ may then first fire the cell at time T-9 when the sum of the applied voltage $V_f$ and the memory voltage exceeds $V_f$. As previously explained however, after the cell discharge is initiated the memory voltage rapidly charges towards the applied voltage. Therefore as seen in FIG. 4B, after T-9 the memory voltage reverses its polarity and approaches the value of the applied voltage. Since the applied voltage $V$ of FIG. 4B then reverses its polarity at T-10, the cell again fires and extinguishes rapidly at T-11. The memory voltage again reversed its polarity at T-11. This process continues so long as an oscillatory sustain voltage is applied to the cell which is of sufficient amplitude when combined with the memory voltage so as to exceed the firing voltage of the cell $V_f$. The applied voltage of FIG. 4B is termed a sustain voltage because it sustains a continuously repetitive discharge of the cell. Even though the discharge is maintained for only 100 nanoseconds every one-half cycle, the repetitive discharge of the cell at a rapid rate, for example 1 million times per second, will produce light which can be seen by the human eye.

FIG. 4C depicts the technique used in the present invention to stop the repetitive discharge of the cell, or what is the same, to extinguish the cell memory. A slowly increasing unidirectional voltage step is applied in a direction which will initiate the discharge of a cell with a memory. The maturation of the cell discharge is highly dependent upon the slope of the driving waveform; therefore, the applied step does not allow the discharge to fully mature. That is, the discharge does not proceed to Region 3 of FIG. 2 but remains in Region 2. With the discharge in Region 2, the voltage across the cell remains at a significant level. The level is such that when capacitors C-1 and C-2, discharge to approximately 0 volts, the applied voltage $V$ is insufficient to maintain the Region 2 discharge and the discharge extinguishes. Notice however that the discharge has extinguished with the memory voltage substantially zero. Since the sustain voltage is insufficient to initiate a cell discharge in a cell without a previous memory, the sustain voltage may be reapplied to maintain repetitive discharges in the remaining cells with memory without affecting the cell whose memory was extinguished.

Now that the basic mechanisms of a gaseous discharge cell 102 of panel 100 of FIG. 1 have been explained, the preferred method and apparatus for practicing the method of the present invention may be explained. FIG. 4D-X and FIG. 4D-Y show the drive voltages applied to the X and Y drive lines 106 and 104 respectively in order to initiate the repetitive discharge of a particular cell 102 or, what is the same thing, write a cell. Since the voltages applied to the X and Y drive lines are equal and opposite in order to sum to the total drive voltage, only the voltage applied to the X drive lines 106 will be explained.

The first two bipolar, repetitive oscillations or pulses shown in FIG. 4D-X represent the sustain voltage. Pulses are used instead of the sine wave of FIG. 4B to allow the intensity of the display to be easily modulated. The basic method of modulating the display intensity is to vary the frequency of the repetitive discharge. Assuming sine waves were used, varying the frequency of the drive voltage also varies the rise time of the applied voltage around the point at which the cell fires, and varying the rise time varies the cell memory. Therefore allowance must be made in the amplitude of the applied voltage along with the frequency of applied voltage to maintain the cell memory voltage constant. If pulses are used instead of sine waves, pulses may be inserted between existing pulses without any variation in rise times. Therefore, a frequency increase and hence an intensity increase is achieved without an alteration of the rise time of the pulses necessitating an amplitude adjustment. The substitution of pulses for sine waves does not otherwise affect the explanation previously given with respect to FIG. 4B.

FIG. 4D indicates the write operation of the present invention. The sequence of events is: the pulses representing the normal sustain are stopped; a unidirectional, slow rise time, voltage pulse or step is impressed across the particular drive lines to be energized; and a special sustain voltage is impressed upon the step. The sum of the step voltage and the peak value of the special sustain is equal to or greater than the firing voltage of the cell $V_f$. In the preferred embodiment, the peak value of the step is set equal to the peak value of the sustain, and the special sustain is then the difference between $V_f$ and the peak value of the sustain voltage. The cell selected to be written is then fired, and a memory voltage is established in the cell. The next sequence of events is: the special sustain is turned off; the step is withdrawn; and the normal sustain is again applied. Since a memory voltage has been established in the cell, the normal sustain will now cause a repetitive discharge in the written cell. The voltage necessary to initially discharge the cell is the sum of the special sustain and the voltage step as pictured. Either a slow rise time pulse, or a fast rise time pulse may be used, however. The step as pictured is preferred only because it is also used for proper erasing, and special circuitry would be necessary to provide two independent waveforms.

The sequence of waveforms for erasing a written cell according to the present invention is shown in FIG. 4E. What occurs is: the normal sustain is turned off; the slow rise time pulse or step is applied in a direction to initiate a discharge in the cell to be erased; and the step is withdrawn. In the preferred embodiment, the maximum value of the step is set equal to the normal sustain. Therefore, since the cell to be erased is assumed to have the proper memory, the slow rise time leading edge of the step in conjunction with the memory voltage is sufficient to exceed the firing voltage of the cell at some point in the leading edge of the step. Since the cell discharge is initiated slowly, the memory is reduced to zero as previously explained. If only a single cell is to be erased, a slow rise time step need not be used. An applied pulse which, when combined with the memory of the cell, would just initiate the cell discharge would properly erase the cell. A pulse just sufficient to initiate a discharge in the cell will provide proper erasing because the cell must be slightly overdriven in order for the discharge to mature rapidly. A voltage just reaching the discharge threshold will cause the discharge to slowly mature which is the requirement for erasing. In a panel, however, the exact voltages at which each cell will initiate a discharge varies slightly. Therefore, the leading edge of the step may be considered as supplying an infinite variation of pulses having amplitudes varying between zero and the maximum amplitude of the step. Since the cell discharge is very rapid when compared with the rise time of the step, when the voltage applied to the cell by the step just reaches the cell firing voltage the cell fires and extinquishes before the leading edge of the step can overdrive it. Thus, the discharge slowly matures, and the cell memory is erased.

The choice of the value of the sustain voltage may now be explained. Referring to FIG. 2, the memory voltage $V_c$ is seen to be approximately equal to the difference between the sustain voltage $V_s$ and the extinguishing voltage $V_{ex}$. Optimally, a value of $V_s$ just over one-half the difference between the firing voltage and the extinguishing voltage will combine with the cell memory to fire a cell. A compromise is reached upon considering that: as $V_s$ increases, $V_c$ increases, and therefore $V_s$ need be less; and as $V_s$ decreases, $V_c$ decreases and $V_s$ need be greater. The optimum point between these two considerations then appears to be about the midpoint. In practice, however, $V_s$ is set greater than one-half of the difference between the firing voltage and the extinguishing voltage because of the practical considerations. In the preferred embodiment $V_s$ was set at three-fourth $V_f$.

Now that the driving waveforms of the preferred embodiment of the present invention have been explained, the superior margin obtainable using the teachings of the present invention may also be explained. FIG. 5 shows a portion of display panel 100 of FIG. 1 which will now be used to explain the derivation of the margin of the present invention in the three drive modes—the sustain mode, the write mode, and the erase mode. The margin in the sustain mode is the difference in voltage between that voltage necessary to sustain a written cell and that voltage which will allow an adjacent unwritten cell to remain unwritten. With reference to FIG. 5 and assuming the sustain mode, a voltage equal to $V_s/2$ is applied to all drive lines. Assuming cell 102c has an existing memory, $V_s$ and the memory voltage $V_c$ for cell 102c will combine to at least equal $V_f$ and initiate a discharge within cell 102c. Assuming cell 102d has no memory, cell 102d will merely see a voltage $V_s$ across itself and remain unwritten (one-half $V_s$ from X drive line 106b and one-half $V_s$ from Y drive line 104b). The voltage margin then can be expressed as the difference between the voltage which would write the adjacent cell 102d, which is $V_f$, and the voltage actually existing across the adjacent cell 102d, which is $V_s$. Therefore the margin is the difference between $V_f$ and $V_s$. Since in the preferred embodiment $V_s$ was set equal to 75 percent of $V_f$, the sustain mode margin is 25 percent of $V_f$.

In the write mode, assuming cell 102c is desired to be written, the voltages applied are: the sum of one-half of the step voltage and one-half of the special sustain voltage to lines 104a and 106b; and one-half of the special sustain voltage to lines 104b and 106a. The margin in the write mode is the difference between the voltage upon cell 102c, which is assumed to equal the firing voltage of the cell $V_f$, and the voltage on an adjacent unwritten cell, for example 102d, which does not alter the state of the adjacent cell. If the margin becomes zero, cell 102d will be written along with cell 102c. The voltage upon cell 102d is the sum of the voltages applied to drive lines 104b and 106b and is equal to the sum of the special sustain voltage and one-half of the step voltage. The margin then is the difference between the voltage upon cell 102c ($V_f$) and the voltage upon cell 102d (the sum of a special sustain voltage and one-half of the step voltage). Since $V_f$ is equal to the sum of the step voltage and the special sustain voltage, or the special sustain voltage is equal to $V_f$ minus the step voltage, the margin becomes one-half of the step voltage. The margin then is one-half of the sustain voltage because the step voltage and the sustain voltage are equal in the preferred embodiment. Since the difference between $V_f$ and $V_s$ is equal to 25 percent of $V_f$, the margin in the write mode becomes 37½ percent of $V_f$. The margin in the sustain mode was lower at 25 percent of $V_f$, however, so the sustain margin controls.

In the erase mode, assuming cells 102c and 102d are both written and only cell 102c is to be erased, the voltages applied are: one-half of the step voltage is applied to lines 104a and 106b; and no voltages are applied to lines 104b and 106a. The margin then is the difference between the voltage applied to cell 102c to extinguish it and the voltage applied to cell 102d which does not remove the memory of cell 102d. The margin then is one-half the step amplitude or one-half of the sustain voltage because the step amplitude is equal to the sustain voltage in the preferred embodiment. The margin then, as in the write mode, is equal to 37½ percent $V_f$, and the sustain mode margin of 25 percent $V_f$ still controls.

The preferred embodiment then results in a margin of 25 percent $V_f$. With a panel 100 of FIG. 1 of 10 percent uniformity and electronics of 10 percent uniformity, the panel still has a 5 percent working margin. A 5 percent working margin is sufficient. Previous writing and erasing techniques have severely reduced the margin below that of the sustain margin here.

One such technique is taught by Donald L. Bitzer, Hiram Gene Slottow, and Robert H. Willson in their Pat. applications Ser. No. 521,357, now abandoned, and Ser. No. 613,693 entitled "Gaseous Display and Memory Apparatus" filed between 1965 and 1968. This technique writes by allowing the sustain voltage to remain and adding a small voltage to it on the lines to be written. The sum of the two voltages is $V_f$. With reference to FIG. 5, a voltage $V_s$ is applied to all lines, and another voltage $V_f$ minus $V_s$ is applied to lines 104a and 106b to write cell 102c. The margin in this case is the voltage on cell 102c ($V_f$) minus the voltage on cell 102d (the sum of $V_s$ and one-half of $V_f$ minus $V_s$). The write margin here is one-half of $V_f$ minus $V_s$ or 12.5 percent $V_f$ if $V_s$ equals 75 percent of $V_f$ as before. The write margin of the preferred embodiment is 37.5 percent $V_f$. If the panel is then held to a tolerance of 5 percent $V_f$ and inaccuracies in the drive electronics are held to 5 percent $V_f$, then with a margin of 12.5 percent the worst case panel working tolerance would be approximately 2.5 percent $V_f$. None of these tolerances is adequate for a properly operating panel—too severe to be practical.

A more complete operation of the preferred embodiment shown within FIG. 1 may now be explained with reference to all of its components. Assume the display of FIG. 1 is initially unenergized, and it is desired to light specific cells 102 of panel 100 to create a display. For the 8 by 8 matrix shown, cells 102 would be lit in four groups. First, write block 112 energizes the top four X lines 106 to panel 100. Simultaneously, the corresponding write block in the Y axis drive circuitry block 126 energizes the rightmost Y lines 104, one at a time. This simultaneously energizes four X lines 106 and one Y line 104, and by scanning the Y lines 104, the lighting of all the desired cells within the 16 cells forming the top right one-fourth of display 100 is accomplished. A selection is performed by providing pulses to selected clamps corresponding to the X and Y coordinates of the cells which are not to be lit. For example, if two cells are desired to be let which lie on the rightmost Y drive line 104 and lie on the second and third X drive lines 106 of the group energized by write ramp 112, a pulse would be provided to each Y clamp within Y axis drive circuitry block 126 except that clamp connected to the rightmost Y line, and pulses would simultaneously be applied to X clamps 116 and 122. All Y lines 106 except the rightmost line are then clamped to ground. Similarly, only the second and third X lines 106 are allowed to conduct current to display 100. The special sustain voltage would also simultaneously be applied to all lines, one-half from block 110 within X axis drive circuitry block 108 and an equal and opposite one-half from the corresponding special sustain driver within Y axis drive circuitry block 126. The entire display is written in this way by repeating this process for the cells to be lit in the three remaining quarter display areas.

The resulting write waveform applied to the particular cells to be energized via X lines 106 is shown in FIG. 4D–X, and the voltage waveform applied to the particular cells to be energized by Y lines 104 is shown in FIG. 4D–Y. The equal and opposite step voltages with the equal and opposite special sustain pulses superimposed are shown.

More particularly, the step shown in FIG. 4D–X is provided by the circuitry of FIG. 7. First a positive going pulse is applied to input 732 of the circuitry of FIG. 7A. The 5-volt pulse is reduced to 2.5 volts by zener diode 730, overcomes the bias provided through resistor 728 which normally maintains transistor Q–6 in a conducting state, and causes transistor Q–6 to assume a nonconducting state. A negative going pulse simultaneously applied to input 714 similarly allows the bias provided through resistor 716 to cause transistor Q–4 to assume a conducting state. The current conducted by transistor Q-4 through resistor 718 causes transistor Q-5 to provide a negative current pulse to output point 727. While the output pulse is shown with a relatively fast rise time within FIG. 7A, the effect of charging the line capacitance and capacitors 124 of FIG. 1 yields the slow rise time of the step shown within FIG. 4D-X. A similar operation energizes the write step shown within FIG. 7B.

The special sustain circuitry within FIG. 6 is energized by negative going pulses applied to the bases of transistors Q-6 and Q-6' as previously described in connection with FIG. 6.

A negative going pulse applied to input 805 of the X clamp shown within FIG. 8A removes the bias previously supplied to maintain transistor Q-2 in a nonconducting stage, renders transistor Q-2 conducting, and prevents the X lines 106 to which it is attached from accepting a voltage different from ground. Normally, a positive voltage is applied to input 805 which, when reduced by the voltage of zener 806, maintains transistor Q-2 in a nonconducting state. The negative going pulse causes transistor Q-2 to assume a conducting state and clamp the X lines to which it is attached. Clamping of Y lines 106 is correspondingly accomplished by the application of a positive pulse to the Y clamp shown within FIG. 8B.

After the four groups of 16 cells each are sequentially lit to form the complete desired pattern, the write mode is terminated and the sustain mode is initiated. The sustain mode is initiated by alternately and repetitively applying negative going pulses to transistors Q-1 and Q-1' of FIG. 6 as previously explained. The X and Y sustain drivers are identical except for the winding configuration of secondary transformer 620. The configuration of secondary windings 620 is as shown in FIG. 6 for the X sustain drivers; the dotted end of secondary 620 is reversed for the Y sustain drivers. The normal sustain is shown within FIGS. 4D and 4E. During the sustain mode, normally conducting transistor Q-6 and diode 724 clamp output point 727 of the X axis write and erase circuitry within FIG. 7A to ground. This allows a transistor of lower voltage breakdown to be selected for transistor Q-5. A similar function is performed by normally conducting transistor Q-3 and diode 710 of the Y axis write and erase circuitry driver shown within FIG. 7B.

The display may be erased by the technique previously described. More particularly and with reference to the circuitry, the alternate and repetitive pulse inputs to transistors Q-1 and Q-1' of FIG. 6 are stopped, thus stopping the sustain pulses. The exact phase at which the sustain is stopped is important, however, because a single polarity erase step is provided by blocks 112 and 114 of the X axis drive circuitry of block 108 and the corresponding erase drivers of the Y axis drive circuitry of block 126. As previously explained, in order to properly erase the memory of a cell which has previously been repetitively discharged, the erase step pictured within FIGS. 4E-X and 4E-Y must slowly initiate a discharge so as to prevent the cell discharge from fully maturing. That is, the sustain pulses must be stopped so that the direction of the step applied will cause the discharge of all lit cells. The correct polarities are shown within FIG. 4E. Component values for a preferred embodiment of FIG. 1 are as follows:

Capacitor 124=470 picofarads
Resistor 128=27 kilohm
Resistor 130=47 kilohm Component values for a preferred embodiment of the normal sustain driver shown within FIG. 6 are as follows:
Resistor 600=1 kilohm
Resistor 602=100 ohms
Resistor 604 and 606=150 ohms
Resistor 608=100 ohms
Resistor 610 and 612=100 ohms
Resistor 614=28 kilohms
Transformer 617 has primaries 616, 622, 634, & 636 of 40 turns & secondary 620 of 80 turns.
Diode 618=1N 661
Transistor Q-1, Q-2, Q-4=2N3009
Transistor Q-3 and Q-5=MH5552

The component values of the remaining symmetrical portion of the normal sustain driver are identical to those already given, and may be ascertained by noting the component value of the symmetrical part given above.

Component values for a preferred embodiment of the special sustain driver shown within FIG. 6 are as follows:
Resistor 624=1 kilohm
Resistor 626=100 ohms
Resistor 628=150 ohms
Resistor 630=100 ohms
Resistor 632=28 kilohms
Diode 633=IN 661
Transistor Q-6 & Q-7=2N3009
Transistor Q-8=MH5552

The remaining component values for the symmetrical one-half of the special sustain driver may be ascertained from the values given above.

The component values forming a preferred embodiment of FIG. 7A are as follows:
Zener diode 715=2.4 volts  Q-4=2N4888
Resistor 716=1 kilohm  Q-5=2N3712
Resistor 718=220 ohm  Q-6=2N4888
Resistor 720=4.7 kilohms
Diodes 724 and 726=1N661
Resistor 728=1 kilohm
Zener diode 730=2.4 volt The component values forming a preferred embodiment of circuitry of FIG. 7B are as follows:
Resistor 701=1 kilohm
Resistor 702=470 ohm
Resistor 704=220 ohm
Resistor 706=4.7 kilohm
Diode 709 and 710=1N661
Resistor 712=1 kilohm
Transistor Q-1=2N3712
Transistor Q-2=2N4888
Transistor Q-3=2N3712

The component values forming a preferred embodiment of FIG. 8A are as follows:
Zener diode 806=2.4 volt
Resistor 808=470 ohms
Diode 810=1N661
Transistor Q-2=2N4888

The component values for a preferred embodiment of FIG. 8B are as follows:
Resistor 800=1 kilohm
Resistor 802=470 ohm
Diode 804=1N661
Transistor Q-1=2N3712

Now that the basic teachings of the present invention have been explained, many extensions and variations will be obvious to one skilled in the art. For example, an 8 by 8 cell array shown as panel 100 within FIG. 1 may be extended in size, shape, configuration, and number of cells depending on the desired result to be obtained.

Also, the exact circuitry within the blocks may be varied within the teachings of the present invention.

Additionally, different types of circuits may be used to practice the present invention. Adherence to the basic teachings is all that is necessary.

Further, power supplied not shown may be necessary to provide power to some of the circuitry in the box.

The preferred embodiment of the present invention is described for illustrative purposes only; no limitation is intended. Many variations will be obvious to one skilled in the art. It is desired that the present invention be limited only by the appended claims in which it is intended to cover the full scope and spirit of the present invention.

We claim:

1. In conjunction with a gaseous discharge display where voltages applied between at least one of a set of X drive lines and at least one of a set of Y drive lines control the light emitted by a gas discharge cell at the intersection of the X and Y drive lines energized, the drive lines being insulated from the gas within the cell, the improvement comprising means for erasing gas cells, comprising a voltage step generator, connected to the drive lines to be energized, for providing a voltage step of sufficient amplitude to cause the discharge of gas cells having an associated memory voltage, the voltage step preventing full maturation of the discharge within the gas cell for causing the memory voltage to become substantially erased.

2. The apparatus of claim 1, wherein the voltage generator further comprises capacitive means for providing a voltage step having a slow rise time for preventing the full maturation of the discharge within the gas cell.

3. Control for a gaseous discharge display device having a plurality of gas-filled cells, an array of X drive lines on one side of the cells, insulated from the gas therein by an insulating medium, an array of Y drive lines on the other side of the cells, insulated from the gas therein by an insulating medium and arranged orthogonally to the X drive lines so that each cell is associated with one specific X drive line and one specific Y drive line, each drive line being capacitively coupled to its respective cells by way of the insulating media for discharging selected cells, thereby causing light emission at a nominal discharge voltage $V_f$ applied across the selected cells, and where a memory voltage $V_c$ remains across the selected cells after discharge and after the drive voltage has been removed, the improvement comprising:
   a. pulse generating means selectively connected to the X drive lines for applying a unipolar pulse to each selected line;
   b. pulse generating means selectively connected to the Y drive lines for applying a unipolar pulse to each selected line, phased to add to the unipolar pulse on selected X drive lines, at the intersections of selected lines;
   c. adjustable oscillating voltage means connected to the X drive lines for applying an oscillating voltage $½V_s$ thereto, whose peak value is at least $½(V_f$ minus $V_c)$;
   d. adjustable oscillating voltage means connected to the Y drive lines for applying an oscillating voltage $½V_s$ thereto, whose peak value at least $½(V_f$ minus $V_c)$, phased to add to the oscillating voltage on the X drive lines so that $V_s$ is impressed across each cell;
   e. means for superimposing an oscillating voltage $½V_s'$ on unipolar pulses present on selected X drive lines so that the voltage sum is at least $½V_f$; and
   f. means for superimposing an oscillating voltage $½V_s'$ on unipolar pulses present on selected Y drive lines so that the peak voltage sum is at least $½V_f$, phased to add to the unipolar pulses with the superimposed oscillating voltage present on the selected X drive lines so that $V_f$ is impressed across the selected X and Y drive lines at their intersections.

4. The apparatus of claim 1 wherein the pulse generating means selectively connected to the X drive lines further comprise clamping means for diverting the unipolar pulses from all but the selected X drive lines.

5. The apparatus of claim 4 wherein the pulse generating means selectively connected to the Y drive lines further comprise clamping means for diverting the unipolar pulses from all but the selected Y drive lines.

6. The apparatus of claim 5 wherein the adjustable oscillating voltage means for the X drive lines further comprise a bipolar pulse generator.

7. The apparatus of claim 6 wherein the adjustable oscillating voltage means for the Y drive lines further comprise a bipolar pulse generator.

8. A method of controlling the discharge, sustaining the discharge, and extinguishing the discharge of individual cells in a gaseous discharge display device having a plurality of gas-filled cells, an array of X drive lines on one side of the cells, insulated from the gas therein by an insulating medium, an array of Y drive lines on the other side of the cells, insulated from the gas therein by an insulating medium and arranged orthogonally to the X drive lines to that each cell is associated with one specific X drive line and one specific Y drive line, each drive line being capacitively coupled to its respective cells by way of the insulating media, for discharging selected cells, thereby causing light emission, at a nominal discharge voltage $V_f$ applied across the selected cells, and where a memory voltage $V_c$ remains across the selected cells after discharge and after the drive voltage has been removed, comprising the steps of:
   a. selecting at least one X drive line and at least one Y drive line;
   b. applying a unipolar voltage pulse to each selected drive line phased to add together at their intersections;
   c. superimposing an oscillating voltage $½V_s'$ on the unipolar pulses present on each selected drive line, phased to add together at their intersections;
   d. removing $½V_s'$ from the drive lines;
   e. removing the unipolar pulse from each drive line;
   f. applying an oscillating voltage $½V_s$ to each drive line, phased to add at their intersections;
   g. sustaining the discharge by continually applying $½V_s$ to each drive line;
   h. removing $½V_s$ from the drive lines;
   i. selecting at least one X drive line and at least one Y drive line; and finally
   j. extinguishing the discharge by applying a unipolar pulse to each selected drive line, phased to add at their intersections.

9. The method of claim 8 further comprising the step of adjusting voltage $½V_s'$ to an amplitude such that the sum of its peak voltage and the peak voltage of the unipolar pulse is at least $½V_f$.

10. The method of claim 9 further comprising the step of adjusting voltage $½V_s$ to an amplitude such that the sum of its peak voltage and $V_c$ is at least $½(V_f$ minus $V_c)$.

11. The method of claim 10 further comprising the steps of slowing the rise time of the unipolar pulse for extinguishing the discharge, and adjusting the voltage amplitude of the unipolar pulse so that at a selected intersection the sum of the X line unipolar pulse, the Y line unipolar pulse and $V_c$ slowly reaches voltage $V_f$, preventing a full maturation of the discharge of the cell at the intersection.